US006260099B1

(12) United States Patent
Gilbertson et al.

(10) Patent No.: US 6,260,099 B1
(45) Date of Patent: Jul. 10, 2001

(54) MULTI-LEVEL PRIORITY CONTROL SYSTEM AND METHOD FOR MANAGING CONCURRENTLY PENDING DATA TRANSFER REQUESTS

(75) Inventors: Roger L. Gilbertson, Minneapolis; James L. DePenning, Eagan, both of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/218,377

(22) Filed: Dec. 22, 1998

(51) Int. Cl.$^7$ ........................................ G06F 13/14
(52) U.S. Cl. ................ 710/240; 710/36; 710/39; 710/112; 710/129
(58) Field of Search ................ 710/240, 244, 710/243, 112, 129, 36, 39, 40, 52, 60

(56) References Cited

U.S. PATENT DOCUMENTS 4,447,873 * 5/1984 Price et al. .
4,580,291 * 4/1986 Halden .................................. 359/118
5,136,718 * 8/1992 Haydt .................................. 709/215

* cited by examiner

*Primary Examiner*—Ario Etienne
(74) *Attorney, Agent, or Firm*—Charles A. Johnson; Mark T. Starr; Altera Law Group

(57) ABSTRACT

A system and method for managing the flow of data transfer requests from requesting devices to associated data transfer interconnection circuitry in a data processing system. Data transfers are initiated with data transfer requests that identify a data input queue and data output queue for which the data is to be transferred. The data transfer requests are issued from one or more requesting devices in the system. The data transfer requests are queued at a first queuing level. Within the first queuing level, data transfer requests identifying like data input queues are queued together, yet separate from data transfer requests identifying a different data input queue. Each of the data transfer requests from each of the queues in the first queuing level are transferred to a second queuing level to be queued according to the data output queue identified in the data transfer request. Each queue in the second queuing level stored only those data transfer requests identifying like data output queues. A control signal set is generated for each of the data transfer requests that are output from the second queuing level, and each control signal set identifies the data input queue and the data output queue between which the data is to be transferred. The data from the identified data input queues is transferred to the identified data output queues in response to the corresponding control signal sets.

31 Claims, 8 Drawing Sheets

SYMMETRICAL MULTIPROCESSING PLATFORM

MEMORY STORAGE UNIT (MSU)

MULTI-LEVEL PRIORITY CONTROL SYSTEM AND METHOD FOR MANAGING CONCURRENTLY PENDING DATA TRANSFER REQUESTS

CROSS-REFERENCE TO OTHER PATENT APPLICATIONS

The following co-pending patent application of common assignee contains some common disclosure:

"Queueing Architecture and Control System For Data Processing System Having Independently-Operative Data and Address Interfaces", Ser. No. 09/096,822, filed on Jun. 12, 1998, which is incorporated herein by reference in its entirety.

"Transfer Request Selection Method And Apparatus For Symmetrical Multiprocessor Systems", Ser. No. 09/218,210, filed Dec. 22, 1998, concurrently herewith, which is incorporated herein by reference in its entirety.

FIELD OF THE INVENTION

This invention relates generally to transfer request priority management in multiprocessor data processing systems, and more particularly to a system and method for managing the flow of data transfer requests from requesting devices to associated data transfer interconnection circuitry.

BACKGROUND OF THE INVENTION

Large-scale data processing systems typically utilize a tremendous amount of memory. This is particularly true in multiprocessing systems where multiple processing units are implemented. There are several memory methodologies known in the art that provide for efficient use of memory in such multiprocessing environments. One such memory methodology is a distributed memory where each processor has access to its own dedicated memory, and access to another processor's memory involves sending messages via an inter-processor network. While distributed memory structures avoid problems of contention for memory and can be implemented relatively inexpensively, it is usually slower than other memory methodologies, such as shared memory systems.

Shared memory is used in a parallel or multiprocessing system, and can be accessed by more than one processor. The shared memory is connected to the multiple processing units—typically accomplished using a shared bus or network. Large-scale shared memories may be designed to cooperate with local cache memories associated with each processor in the system. Cache coherency protocols ensure that one processor's cached copy of a shared memory location is invalidated when another processor writes to that location.

In order to initiate and establish transfers of data in such a system, a device desiring a data transfer issues a data transfer request. For example, a data transfer request may be issued by a processor to the main memory to fetch a data segment from the main memory, which is thereafter supplied by the main memory to the processor's local memory or cache memory. It is possible that any of the processors, input/output devices and memory devices may be the source or the destination of a data transfer. Managing the data transfer requests in a system where there may be multiple request sources and multiple request destinations therefore becomes very important. Conservatively managing the transfer of these requests may lead to a reduction in system throughput, while mismanagement to obtain greater throughput may lead to memory access conflicts.

For example, where the number of request sources is unequal to the number of request destinations, it is possible that each of the request sources has issued an active data transfer request. Where the number of destinations is less than the number of active data transfer requests, this implies that some of the destinations are being targeted by multiple data transfer requests. A manner of fairly distributing these data transfer requests is required.

Further, because such a system may include multiple destinations for the data transfer requests, such as multiple memory blocks or other local memories, it is possible that a particular request source may issue multiple data transfer requests each identifying a different destination for the request. If these data transfer requests are allowed to be issued simultaneously to the request destination, such as a single-port memory device, indeterminate results can occur. It is therefore important to properly manage the flow of the data transfer requests, taking into account the manner in which the data targeted by the data transfer request is to be routed from the data source to the data destination.

Finally, while managing the flow of data transfer requests, it is also important to maximize system data throughput. To do so requires maximizing the throughput of the data transfer requests. To allow only one data transfer request to be issued at a time would severely limit the system's throughput where data transfer requests between multiple sources and destinations are pending.

Therefore, it would be desirable to provide a system and method that maximizes data throughput, while properly and fairly managing concurrently-pending data transfer requests. The present invention provides a multi-level queuing architecture to manage the data transfer requests, while allowing data transfers to occur in parallel in accordance with rules established by the multi-level queuing architecture. The present invention offers these and other advantages over the prior art, and provides a solution to the shortcomings of the prior art.

SUMMARY OF THE INVENTION

The present invention relates to a system and method for managing the flow of data transfer requests from requesting devices to associated data transfer interconnection circuitry in a data processing system.

In accordance with one embodiment of the invention, a method is provided for controlling transfers of data between devices in a data processing system. Each of the devices includes both a designated data input queue to temporarily store data being transferred from the device, and a designated data output queue to temporarily store data that is output from other devices for receipt by the device. The transfer of data is initiated via data transfer requests that identify the data input queue and data output queue for which the data is to be transferred. The method includes issuing data transfer requests from one or more of the devices, and queuing each of the data transfer requests issued from the one or more devices. The data transfer requests that identify like data input queues are commonly queued in first distinct queues. Each of the data transfer requests from each of the first distinct queues are transferred to second distinct queues, where each of the second distinct queues receives and queues only those data transfer requests identifying like data output queues. A control signal set is generated for each of the data transfer requests that are output from each of the second distinct queues, and each control signal set identifies the data input queue and the data output queue between which the data is to be transferred.

The data from the identified data input queues is transferred to the identified data output queues in response to the corresponding control signal sets.

In accordance with another embodiment of the invention, a multi-level priority control system for managing data transfer requests in a data processing system is provided. The data processing system includes a plurality of data request sources to generate the data transfer requests, and a data interconnect module to establish data transfer connections between identified ones of a plurality of data input queues and a plurality of data output queues. Each of the data transfer requests includes an identification of one of the data input queues and one of the data output queues to which the data transfer is to be effected. The control system includes a first request queue stage having a plurality of input request queues coupled to respective ones of the data request sources. Each of the input request queues receives and temporarily stores corresponding data transfer requests. A second request queue stage is provided, which has a plurality of output request queues, each of which is coupled to each one of the input request queues to receive and temporarily store those of the data transfer requests that identify a particular one of the data output queues as a destination for the data transfer. The control system further includes a control signal generator coupled to the second request queue stage to receive the data transfer requests from each of the output request queues, and to provide a plurality of control signal groups to the data interconnect module. Each of the control signal groups includes control signals associated with one of the output request queues to direct the data interconnect module to route the data between the data input and output queues identified by the corresponding data transfer request.

In accordance with yet another embodiment of the invention, a data transfer system for transferring data between memory modules in a data processing system is provided. The data processing system includes a plurality of processing modules having associated local memories, and a main memory having a plurality of memory banks. The data transfer system includes a plurality of data input queues, each coupled to a respective one of the local memories and the memory banks to receive data requested via a data transfer request. A plurality of data output queues are provided, each coupled to a respective one of the local memories and the memory banks to receive the requested data from the data input queues and to provide the requested data to a requesting one of the local memories and memory banks. A data interconnect module is coupled to the data input queues and to the data output queues to facilitate transfer of the requested data from the data input queues to the data output queues in response to control signals. The data transfer system further includes a transfer request control circuit which includes a first request queue stage having a plurality of input request queues coupled to respective ones of the processing modules to receive and temporarily store corresponding data transfer requests. The data transfer requests include an identification of one of the data input queues and one of the data output queues between which the data transfer is to occur. A second request queue stage having a plurality of output request queues is also provided, wherein each one of the output request queues is coupled to each one of the input request queues to receive and temporarily store those of the data transfer requests that identify a particular one of the data output queues as a destination for the data transfers. The transfer request control circuit also includes a control signal generator coupled to the second request queue stage to receive the data transfer requests from each of the output request queues, and to provide a plurality of control signal groups to the data interconnect module. Each of the control signal groups includes control signals associated with one of the output request queues to direct the data interconnect module to transfer the data between the data input and output queues in response thereto.

Still other objects and advantages of the present invention will become readily apparent to those skilled in this art from the following detailed description. As will be realized, the invention is capable of other and different embodiments, and its details are capable of modification without departing from the scope and spirit of the invention. Accordingly, the drawing and description are to be regarded as illustrative in nature, and not as restrictive.

BRIEF DESCRIPTION OF THE DRAWINGS

The invention is described in connection with the embodiments illustrated in the following diagrams.

DETAILED DESCRIPTION OF THE ILLUSTRATED EMBODIMENTS

The present invention provides a system and method for receiving and prioritizing data transfer requests that ultimately control the transfer of data between memory blocks and processing modules in a multiprocessing system. The invention implements a multi-level queuing architecture for managing the data transfer requests between equal or unequal numbers of data sources and data destinations, and allows each data source to have multiple data transfer requests concurrently pending. The invention manages data transfer request prioritization and request conflicts, while facilitating system throughput.

While the present invention is particularly advantageous in the context of a Symmetrical Multi-Processor (SMP) environment as described below, it will be appreciated by those skilled in the art that the invention is equally applicable to other computing environments requiring management of memory, I/O, or other transaction processing requests. Therefore, the particular SMP environment described in the following figures is provided for illustrative purposes and to provide a full operational understanding of the invention; however the invention is not limited thereto.

Figure 1:
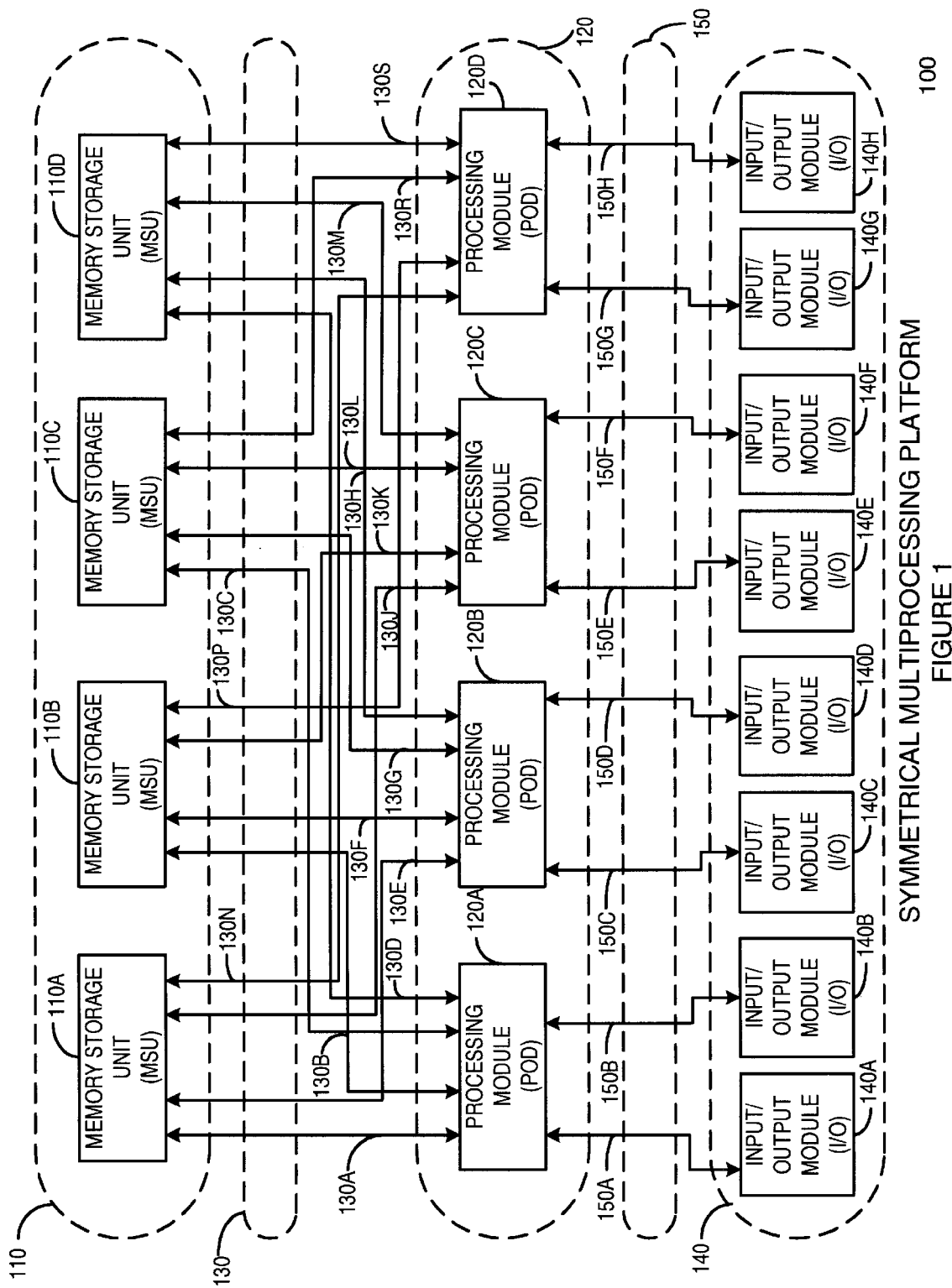
FIG. 1 is a block diagram of a Symmetrical Multi-Processor (SMP) System Platform in which the principles of the present invention may be applied.

FIG. 1 is a block diagram of a Symmetrical Multi-Processor (SMP) System Platform in which the principles of the present invention may be applied. System Platform 100 includes one or more Memory Storage Units (MSUs) in dashed block 110 individually shown as MSU 110A, MSU 110B, MSU 110C and MSU 110D, and one or more Processing Modules (PODs) in dashed block 120 individually shown as POD 120A, POD 120B, POD 120C, and POD 120D. Each unit in MSU 110 is interfaced to all PODs 120A, 120B, 120C, and 120D via a dedicated, point-to-point connection referred to as an MSU Interface (MI) in dashed block 130, individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on. Each MI provides the respective POD 120 direct access to data stored in the respective MSU 110.

In this example SMP environment, MI 130 comprises separate bi-directional data and bi-directional address/command interconnections, and further includes unidirectional control lines that control the operation on the data and address/command interconnections (not individually shown). The control lines operate at a system clock frequency (SYSCLK) while the data bus runs source synchronous at two times the system clock frequency (2×SYSCLK). For example, in one embodiment, the system clock frequency is approximately 100 megahertz (MHZ).

Any POD 120 has direct access to data in any MSU 110 via one of MIs 130. For example, MI 130A allows POD 120A direct access to MSU 110A and MI 130F allows POD 120B direct access to MSU 110B. Each MSU 110 is capable of receiving store/fetch requests from up to four PODs 120 at one time via the MI interfaces 130. These requests can be routed to storage within the MSU 110 for writing or reading data, or requests can cause data to be routed directly to another POD 120. PODs 120 and MSUs 110 are discussed in further detail below.

System Platform 100 further comprises Input/Output (I/O) Modules in dashed block 140 individually shown as I/O Modules 140A through 140H, which provide the interface between various Input/Output devices and one of the PODs 120. Each I/O Module 140 is connected to one of the PODs across a dedicated point-to-point connection called the MIO Interface in dashed block 150 individually shown as 150A through 150H. For example, I/O Module 140A is connected to POD 120A via a dedicated point-to-point MIO Interface 150A. The MIO Interfaces 150 are similar to the MI Interfaces 130, but may have a transfer rate that is approximately half the transfer rate of the MI Interfaces because the I/O Modules 140 are located at a greater distance from the PODs 120 than are the MSUs 110.

Figure 2:
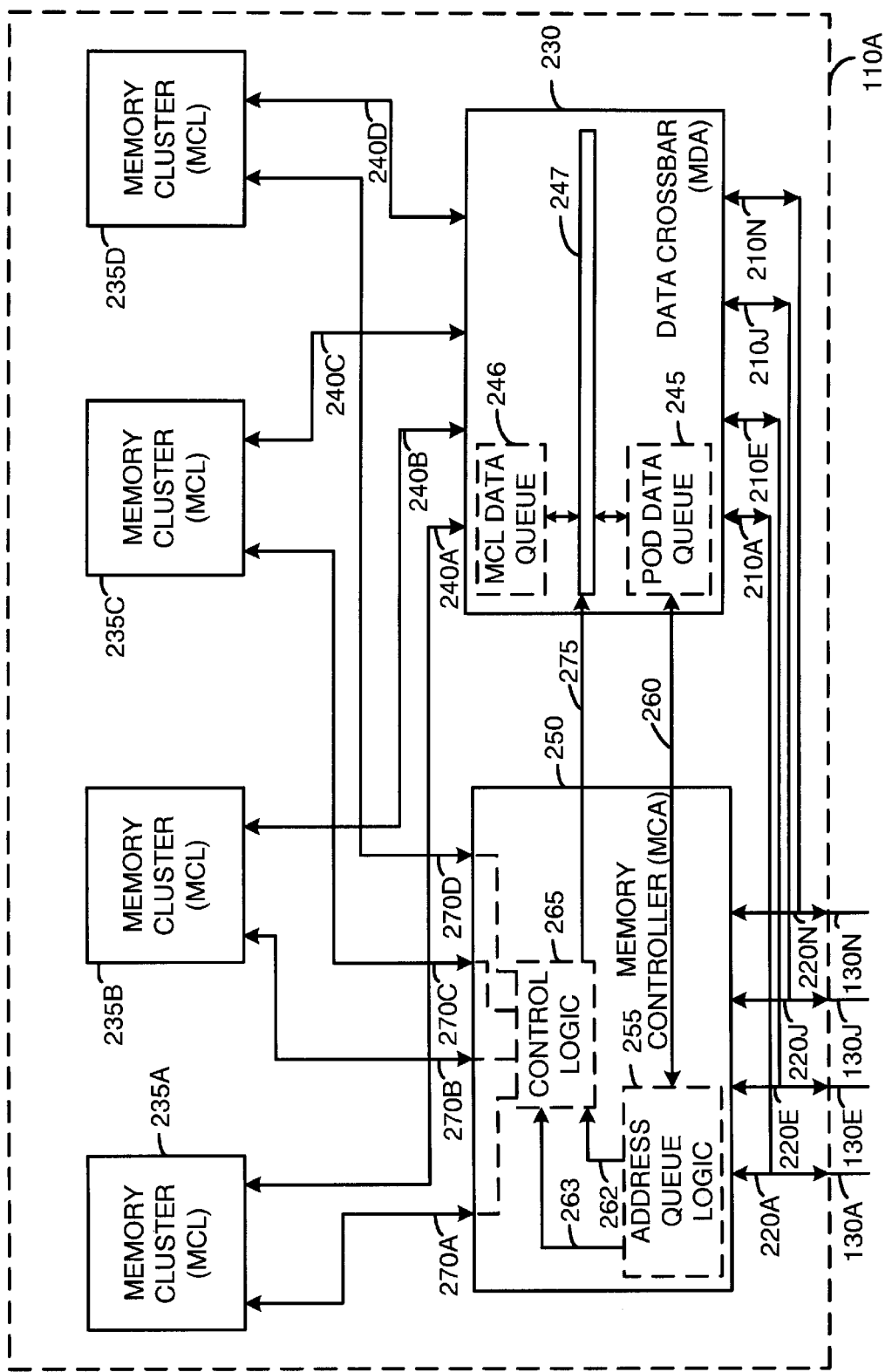
FIG. 2 is a block diagram of one embodiment of a Memory Storage Unit (MSU)

FIG. 2 is a block diagram of a Memory Storage Unit (MSU) 110. Although MSU 110A is shown and discussed, it is understood that this discussion applies equally to each of the MSUs 110. As discussed above, MSU 110A interfaces to each of the PODs 120A, 120B, 120C, and 120D across dedicated point-to-point MI Interfaces 130A, 130E, 130J, and 130N, respectively. Each MI Interface 130 actually includes two separate, independently-operative interfaces. The first interface is shown as Data Interface 210 (illustrated as 210A, 210E, 210J, and 210N). Each set of Data Interfaces 210 includes bi-directional data bits, parity signals, and uni-directional control signals (not individually shown in FIG. 2). In addition to the Data Interfaces 210, each MI Interface 130 includes bi-directional Address/function Interfaces 220 (shown as 220A, 220E, 220J, and 220N), each of which includes address/function signals, uni-directional control signals, and a uni-directional address request (not individually shown in FIG. 2). Data Interfaces and Address/function Interfaces operate in split transaction mode. That is, for a given request, the data signals provided on Data Interfaces 210, and the Command information provided on Address/function Interfaces 220 may be transferred at different times during completely disassociated transfer operations, as is discussed further below.

Generally, a request provided by the POD 120 is stored in two logical entities within the MSU 110. The address and function portion of a request are routed to the Memory Controller (MCA) 250 and stored in a store/fetch queue. It should be recognized that the term "queue" is not restricted to a narrow definition such as a first-in-first-out (FIFO) structure, but rather is defined broadly as a temporary storage structure where requests/data can be temporarily stored until further processing can continue. The data portion of the request is stored in the Memory Data Crossbar (MDA) 230 in one of a plurality of POD Data Queues 245. The data portion of a request is routed via a crossbar interconnect 247 to either an Memory Cluster (MCL) Data Queue 246 for an addressed one of the Memory Clusters 235, or will be routed to another POD Data Queue 245 to be transferred directly to another POD during a POD-to-POD data transfer operation. Similarly, data returned to a POD following a fetch request is routed via interconnect 247 from the addressed one of the MCL Data Queues 246 to the POD Data Queue 245 which is associated with the requesting POD. The routing of this information is controlled via control lines provided to the MDA by the MCA. The following paragraphs describe the MSU 110 of FIG. 2 in greater detail.

Data Interface 210A, 210E, 210J, and 210N interface to the Memory Data Crossbar (MDA) 230. The MDA 230 buffers data signals received on Data Interfaces 210 from the PODs 120, and provides the switching mechanism that may route these buffered data signals to an addressed one of the storage units called Memory Clusters (MCLs) 235 (shown as 235A, 235B, 235C, and 235D) via Bi-directional Interfaces 240 (shown as 240A, 240B, 240C, and 240D). Data signals are also returned from MCLs 235 to a requesting POD 120 via Bi-directional Interfaces 240 and MDA 230.

In addition to routing data signals between various ones of the PODs 120 and ones of the MCLs 235, the MDA 230 also routes buffered ones of the data signals received from PODs to any ones of the PODs during POD-to-POD transfer operations to be discussed further below. For example, data signals received from POD 120A and buffered by MDA 230 may be routed to Data Interface 210A, 210E, 210J, or 210N for reception by POD 120A, 120B, 120C, or 120D, respectively.

The MDA buffers the data signals provided by PODs 120 via Data Interfaces 210 in POD data queue structures. A distinct queue structure is provided for each of the Data Interface 210A, 210E, 210J, and 210N. In FIG. 2, the POD data queue structure associated with Data Interface 210A is shown as POD Data Queue 245. Similar queue structures (not shown) exist for the other Data Interfaces 210E, 210J, and 210N. POD Data Queue 245 can be any addressable storage device capable of storing a predetermined maximum number of data signals.

The MDA also buffers the data signals provided by MCLs 235 via Data Lines 240 in MCL data queue structures. A different queue structure is provided for each of the Data Lines 240A, 240B, 240C, and 240D. In FIG. 2, the MCL data queue structure associated with Data Lines 240A is shown as MCL Data Queue 246. Similar queue structures (not shown) exist for the other Data Lines 240B, 240C, and 240D. MCL Data Queue 246 can be any addressable storage device capable of storing a predetermined maximum number of data signals.

Whereas the MDA 230 buffers data signals provided via Data Interfaces 210 and Data lines 240, the Memory Controller (MCA) 250 buffers the address and control signals associated with POD-to-MSU requests that are provided via Address/function Interfaces 220. The MCA includes an input queue structure for each of the Address/function Interfaces 220. The input queue structure for Address/function Interface 220A is shown in FIG. 2 as Address Queue 255. Similar address queue structures (not shown) are provided for each of the other Address/function Interfaces 220E, 220J, and 220N.

As mentioned above, for those requests during which the POD provides data to the MSU, which includes message operations and most memory store operations, the command and associated data are not necessarily transferred by the POD to the MSU at the same time. This is because the Data Interfaces 210 and the associated Address/function Interfaces 220 do not operate in lock step. Therefore, for predetermined request types, address and control signals may precede the associated data signals or vice versa. Thus data signals may be stored within POD Data Queue 245 until the associated address is received on Address/function Interfaces 220. Alternatively, address signals may be stored temporarily in Address Queue 255 until the associated data signals are received on Data Interfaces 210. The indication that data is being transmitted by the POD is provided by a uni-directional control signal in each set of Data Interfaces 210. This signal is used to correlate address signals stored within Address Queue 255 to associated data signals stored within POD Data Queue 245 in a manner to be discussed in detail below.

Once both address signals and associated data signals for a given POD request are resident within the respective queue structures, the address signals are provided on Lines 262 or 263 to Control Logic 265 for further processing in a manner to be discussed below. Control Logic 265 provides arbitration and control to gate the address and appropriate read/write control to the appropriate one of the MCLs 235 across address Lines 270 (shown as 270A, 270B, 270C, and 270D) if the request involves a memory operation. Control Logic 265 further provides Control Signals 275 to Data Queue Interconnect Logic 247. Control Signals 275 provide all the data routing control to logically connect a data source queue to a data destination queue. Control Signals 275 control interconnection of source and destination data queues, and also initiate sequences to move the data. Data can be transferred from POD Data Queue 245 to MCL Data Queue 246 for memory stores, MCL Data Queue 246 to POD Data Queue 245 for memory fetches, or POD Data Queue 245 to another one of the POD Data Queues (not shown) for POD-to-POD message transfer operations, or other POD-to-POD operations.

Figure 3:
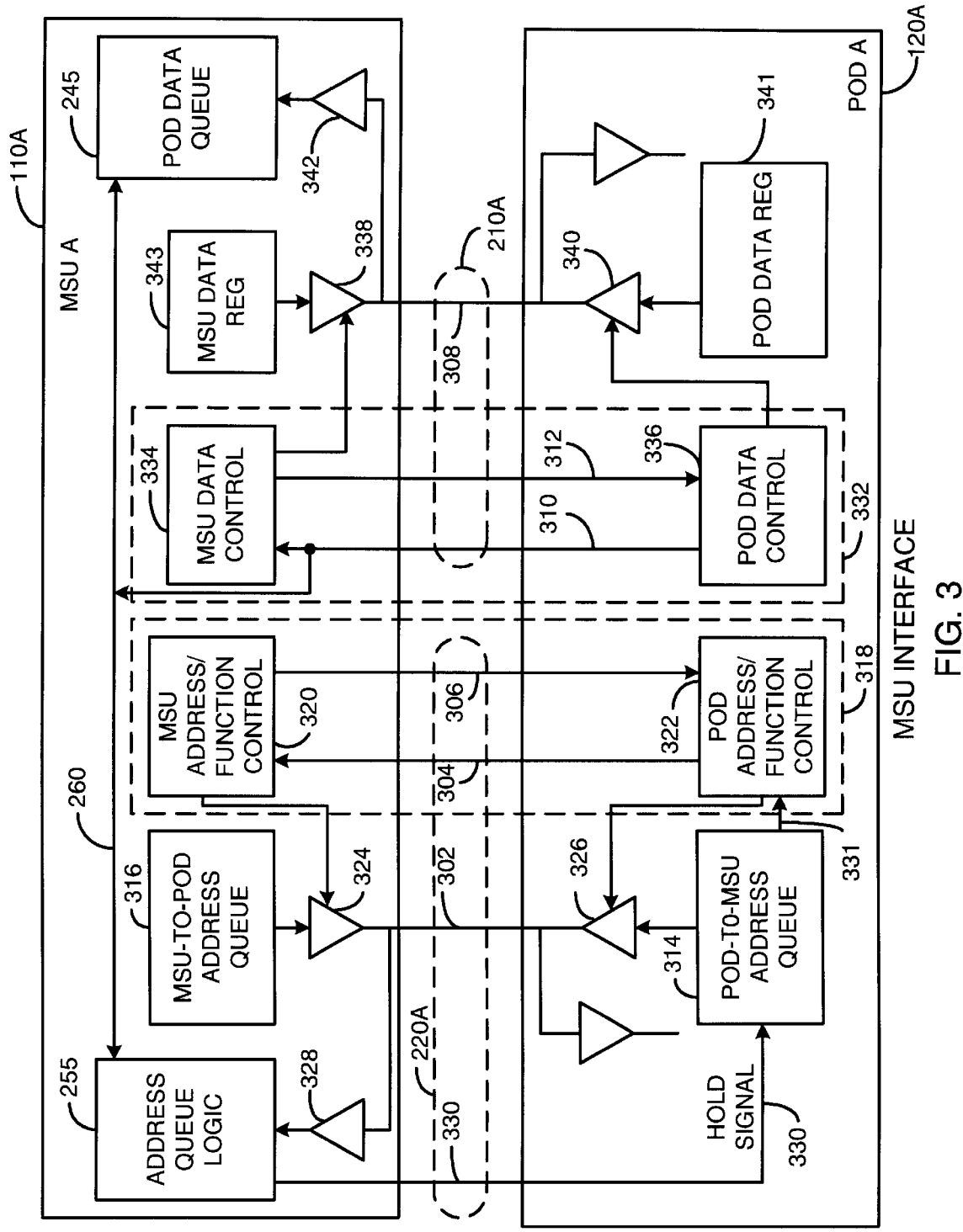
FIG. 3 is a block diagram of bi-directional MSU Interface (MI) and associated interface control logic.

FIG. 3 is a block diagram of bi-directional MSU Interface (MI) 130A and associated interface control logic. It is understood that a similar structure is associated with each of the MI Interfaces 130. As discussed above, MI 130A includes Address/function Interface 220A and Data Interface 210A (shown dashed). These bi-directional interfaces transfer address and data information, respectively, between POD 120A and MSU 110A. These interfaces do not operate in lock step. That is, at any instant in time, the transfer operation being performed on the Address/function Interface 220A may be associated with a different request than is being serviced on Data Interface 210A.

The Address/function Interface 220A includes bi-directional Address/Function (A/F) Lines 302 which in one embodiment contains 21 signals for transferring address and control information, and also include associated parity signals. Address/function Interface 220A also include an associated POD Request Signal 304, (also called "P_REQ"). When a request is initiated from the POD to the MSU, the POD Request Signal 304 is asserted, and the A/F Lines 302 are driven by the POD during a two-cycle transfer operation which is capable of conveying up to 42 bits of address and control information regarding the request. The control information provided by the A/F Lines includes information indicating the type of request being made. The types of requests which may be indicated by the A/F Signals include POD requests to store/fetch data to/from memory, I/O requests to gain memory access, and requests to send message data signals from one POD to another POD. A/F Lines also convey address information which varies depending on the type of request being submitted. During requests to store/fetch data to/from memory, the A/F Lines 302 provide a MSU address associated with the requested data transfer. For a POD-to-POD message request, the A/F Signals identify the destination POD 120 which is to receive associated message data, and also identify other specific information about the type of message.

The bi-directional A/F Lines 302 may also be driven by the MSU after the MSU gains control of the interface by asserting the MSU Request Signal 306. MSU 110A drives the A/F Lines 302 to provide a function code and associated address signals to POD 120A which cause the POD to perform a specified operation. These operations are associated with maintaining coherency between the MSUs 110 and various cache memories in Platform 100. For example, a Return function code is issued by MSU 110A to POD 120A after another one of the PODs 120 or I/O Modules 140 requests access to data which may have been updated within one of the caches located in POD 120A. When POD 120A receives the Return function code, the POD responds by returning the addressed data to the MSU so that the other POD or I/O Module may have access to that data. This return of data is a type of store command and will cause a memory store. The return may also cause a POD-to-POD data transfer if this type of operation is enabled in the MSU. Similarly, a Purge function code is issued by MSU 110A to POD 120A when data stored within one of the cache memories within POD 120A becomes unusable for various coherency reasons.

MI Interface 130A also includes Data Interface 210A. Data Interface 210A of one embodiment includes Data Signal Lines 308 which contain 64 bi-directional data lines and associated parity and parity error signals (not individually shown.) Data Interface 210A also includes Data Request Signal 310 (or "P_ARB"), which is asserted by the POD when the POD initiates a POD-to-MSU data transfer operation. Several clock cycles later, the data is transferred from the POD to the MSU in eight successively-performed 8-byte transfer operations so that the total transfer conveys a 64-byte packet. In one embodiment, each of the 8-byte transfer operations occurs at a rate of twice the system clock frequency.

Data is transferred from the POD to the MSU via Data Signal Lines 308 during message transfer operations when POD 120A is sending message data to be routed to another POD via the MSU 110A. Data is also sent to the MSU 110A during most, but not all, store operations. (For simplicity, this Specification will discuss "store" operations as those stores that are associated with POD-supplied data signals.) Finally, data is sent by the POD to the MSU via Data Signal Lines 308 following the POD's reception of a Return function from the MSU, as discussed above. During each of these transfers, the POD gains control over Data Signal Lines 308 by asserting the Data Request Signal 310.

The MSU 110A also performs transfer operations over Data Signal Lines 308 to the POD 120A. These transfer operations occur when the MSU returns requested fetch data, provides a POD-to-POD pathway for routing returned data from one POD to another POD, or provides message data which is routed from a different POD 120. In any of these instances, the MSU arbitrates and gains control of the Data Signal Lines 308 using the Response Signals on Line 312. The Response Signals are a group of vectored signals which informs the POD of the type of operation being performed; for example, whether the data is associated with a message data transfer or a fetch data transfer. In the case of data associated with a fetch data transfer, the Response Signals also provide the correlation between the previously-issued POD-to-MSU fetch request, and the data being returned by the MSU 11A. This correlation is performed using a multi-bit code called a "job number". This number is necessary because memory requests are not necessarily processed in the order in which they are received from POD 120A. Therefore MSU 110A must inform POD 120A which request is associated with returned data.

As discussed above, Address/function Interface 220A operates independently of Data Interface 210A. That is, for a given request, there is no rigid timing relationship between the transfer of data and the transfer of the associated address and control signals. POD 120A queues address signals for transfer via Address/function Interface 220A in the POD-to-MSU Address Queue 314, and the MSU 110A queues address and function codes in the MSU-to-POD Address Queue 316. The control of request selection for the A/F Lines 302 is performed using Distributed Address/function State Machine 318, which includes MSU Address/function Control 320 and POD Address/function Control 322. Distributed Address/function State Machine 318 uses the POD Request Signal 304 and the MSU Request Signal 306 to arbitrate for use of A/F Lines 302, and to bias tri-state drivers 324 and 326 based on the outcome of the arbitration.

After address and control information is transferred by POD 120A on A/F Lines 302 to MSU 110A, this information is driven via tri-state Receiver 328 to Address Queue Logic 255 where it is stored until it is ready to be processed by the MSU 110A. If the request is associated with data, the request information must be stored within Address Queue Logic 255 until the associated data signals are transferred by POD 120A to the MSU. Since the address and data interfaces are not synchronized, there is no predetermined time when this must occur. Address Queue Logic 255 is capable of storing a predetermined maximum number of commands, which in a preferred embodiment is sixteen. Before this predetermined maximum number has been reached, the Address Queue Logic 255 asserts the Hold Signal 330 to POD-to-MSU Address Queue 314, which then forwards the Hold Signal on Line 331 to POD Command Control 322. The Hold Signal prevents POD Address/function Control 322 from sending more requests until the Hold Signal is de-asserted. The MSU asserts the Hold Signal early enough so that address transfers which are already in the process may be completed, and no overrun conditions occur within the Address Queue Logic 255. The Hold Signal 330 is therefore another mechanism used to throttle the rate at which address signals are sent by the POD to the MSU.

Control of Data Interface 210A is similar to the control provided for Address/function Interface 220A. Distributed Data State Machine 332, which includes MSU Data Control 334 and POD Data Control 336, controls the use of Data Signal Lines 308 through the Data Request Signal 310 and the Response Signals 312. Distributed Data State Machine 332 biases tri-state drivers 338 and 340 based on the outcome of the arbitration.

Before transmission over Data Signal Lines 308, data signals are stored in POD Data Register 341. When the POD obtains control of the interface, these signals are driven by tri-state Driver 340 to the MSU. Within the MSU, the data signals are driven to POD Data Queue 245 via Receiver 342, where they are stored until they are selected for processing by the MSU 110A. When data signals are transferred by MSU 110A to POD 120A, the data signals are provided by MSU Data Register 343, and are passed to a buffer (not shown) within POD 120A where they await routing to the appropriate cache memory.

Since address and data signals for a POD-to-MSU store or message request are not necessarily transferred at the same time, address and data information associated with the same request must be correlated sometime after this information is transferred over the Address/function Interface 220A and Data Interface 210A, respectively. In the MSU, this correlation process is performed using the uni-directional Data Request Signal 310 in conjunction with state information contained within MSU Data Control 334, and address information queued in the Address Queue Logic 255. The MSU Data Control 334 forwards the Data Request Signal 310 to Address Queue Logic 255 and to Data Queue 245 on the interface shown as Control Lines 260.

Figure 4:
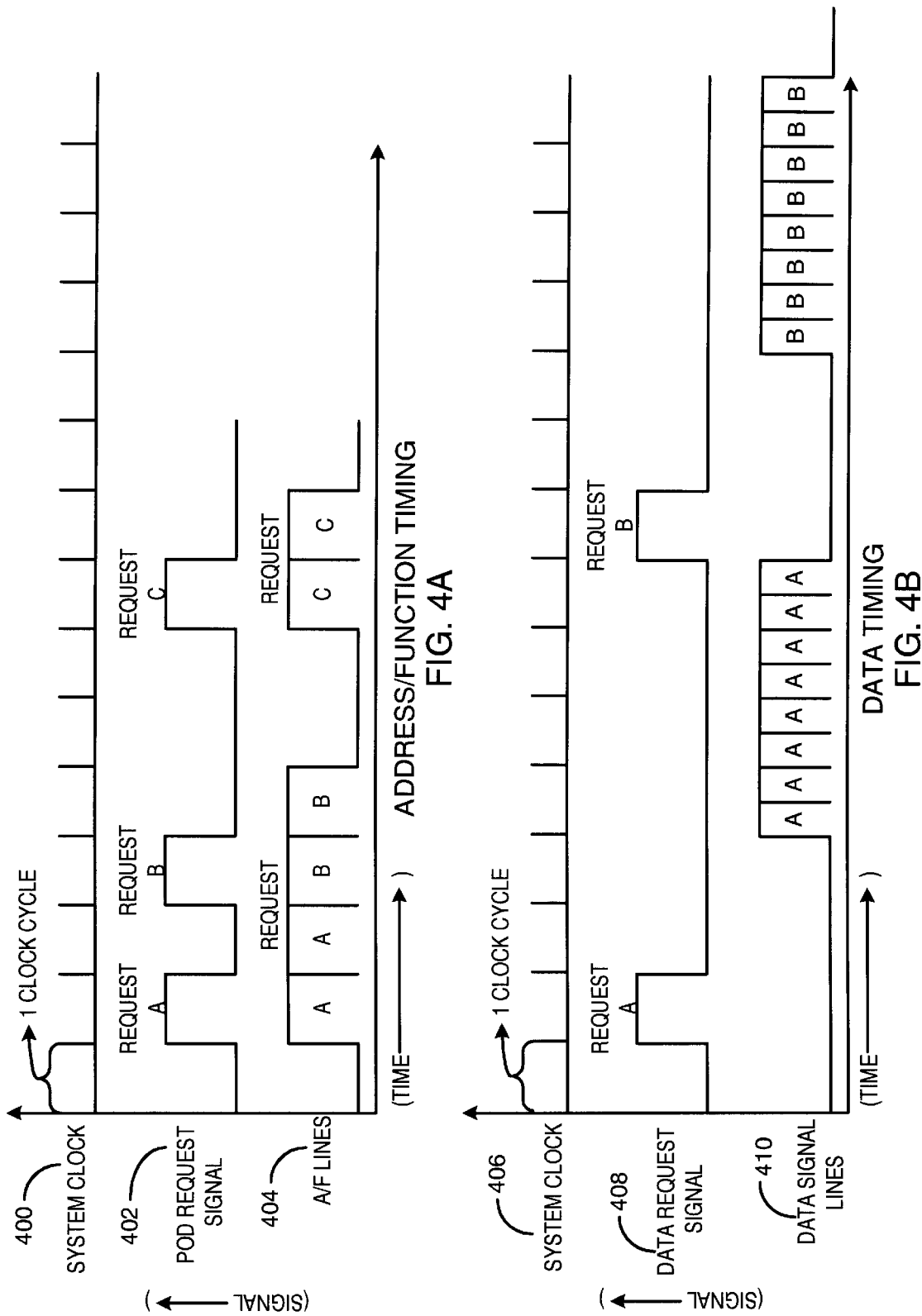
FIG. 4A is a timing diagram of a POD-to-MSU address transfer.
FIG. 4B is a timing diagram of a POD-to-MSU data transfer.

FIG. 4A is a timing diagram of a POD-to-MSU address transfer. The timing diagram is discussed in terms of MI 130A, although it is understood that this discussion applies to all MIs 130. Waveform 400 represents the system clock, which in a preferred embodiment operates at 100 MHz. As shown in waveform 402, the uni-directional POD Request Signal 304 is asserted for one clock cycle each time a POD-to-MSU command transfer is performed. This informs the MSU 110A that POD 120A is performing a transfer on the Address/Function (A/F) Lines 302. At the same time the POD asserts POD Request Signal 304, the first of two consecutive transfers is initiated on the A/F Lines 302. This transfer requires one clock cycle to complete and is immediately followed by a second transfer. In total, the two-cycle transfer conveys 42 bits of address and control information to the Address Queue Logic 255. It may be noted that two requests may be made back-to-back on the interface, as shown by the back-to-back occurrence of Requests A and B in waveform 404 of FIG. 4A. Sometime later, this waveform shows Request C being made. The scheduling and control over the use of A/F Lines 302 is provided by Distributed Address/Function State Machine 318 as discussed above.

FIG. 4B is a timing diagram of a POD-to-MSU data transfer. As in FIG. 4A discussed above, waveform 406 represents the system clock, which in the preferred embodiment operates at 100 MHz. Uni-directional Data Request Signal 310 is asserted for one clock cycle each time a POD-to-MSU data transfer is about to be performed to inform the MSU that the POD is arbitrating for use of the Data Signal Lines 308 as illustrated in waveform 408. When the MSU receives the asserted Data Request Signal, the MSU will complete any current transfer of data on Data Signal Lines 308, and will then will relinquish control of the interface. Distributed Data State Machine 332 within the POD indicates when the MSU transmission is completed. After the MSU has relinquished control of the interface, a minimum of one clock cycle must occur while the bus settles. As shown in FIG. 4B, the POD must wait a minimum of three clock cycles between the initial assertion of the Data Request Signal and the first transmission of data on Data Signal Lines 308 regardless of whether the MSU is using the Data Signal Lines when the request is made. When the POD begins the data transfer, eight consecutive transfer operations are performed on the 64-bit (8-byte) Data Signal Lines 308 at twice the system clock frequency, as shown in waveform 410. The transferred 64-byte packet is buffered in POD Data Queue 245, matched with the associated address using the queue mechanism discussed below, and finally selected by the MSU for processing. A second data request may be made immediately following the first request, as shown in FIG. 4B.

There is no rigid timing relationship imposed between the transmission of data and the transmission of the associated command signals. Allowing the Address/function Interface 220A to operate independently of the Data Interface 210A is especially important since many requests within the exemplary system described do not require the immediate transmission of data signals from the POD to the MSU. Address and control information associated with requests that do not require transmission of data signals may be transferred on the independent Address/function Interface while an unrelated data transfer is completing on the Data Interface 210A, thereby increasing system throughput. Requests not associated with POD-to-MSU data transfers include POD and I/O requests to fetch data from the MSU, some special store operations, and some commands issued by the MSU to the POD.

Although there is no rigid timing relationship imposed between address and data transfer operations for a given request, it is required that for those requests associated with data signals, the same order be maintained for the transfer operations performed on the Address/function Interface 220A and the transfer operations performed on the Data Interface 210A. For example, if address and control information is transferred via Address/function Interface 210A for request A, then for request B, the same ordering must be maintained for the later-performed data transfer operations. The data for request B may not precede that for A.

In some instances, it may also be required that the POD Request Signal 304 be asserted sometime prior to, or at the same time as, the assertion of the associated Data Request Signal 310. This requirement is not considered a limitation because A/F Lines 302 are capable of transferring approximately three times the number of requests in a given time period as compared to Data Signal Lines 308. Therefore, for a given transfer, the A/F Lines 302 are generally available for use either before, or at the same time as, the Data Signal Lines 308 become available. The POD Request Signal 304 may be asserted after the Data Request Signal 310 in those cases in which the MSU will be performing one or more command transfers to POD 120A on A/F Lines 302 when POD 120A seeks to perform both an address transfer and an associated data transfer to the MSU. In these situations, POD 120A is allowed to perform one data transfer which precedes the associated command transfer.

With the SMP environment and general operation having been described, a more detailed description of the data transfer within the MSU is now provided. As was previously described in connection with FIG. 2, the MDA 230 is responsible for routing data signals between PODs 120 and the MCLs 235. The MDA 230 buffers the data signals provided by the PODs 120 and provided by the MCLs 235 in various queue structures. These queue structures were generally described as the POD Data Queue 245 and the MCL Data Queue 246 of FIG. 2.

Figure 5:
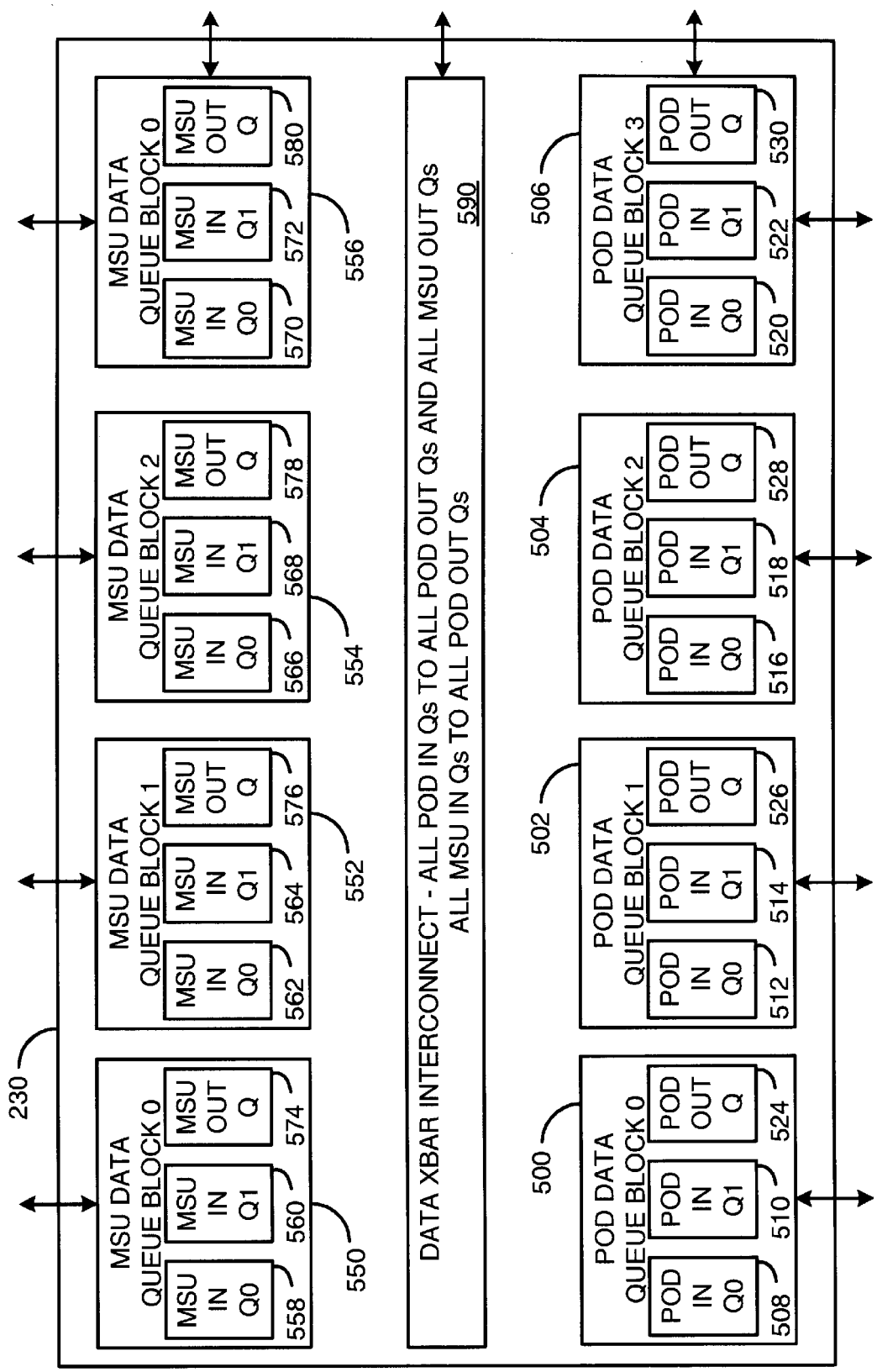
FIG. 5 is a more detailed view of the MDA queuing structures in accordance with one embodiment of the invention.

FIG. 5 is a more detailed view of the MDA 230 queuing structures in accordance with one embodiment of the invention. In this example, it is assumed, as it was in connection with FIGS. 1 and 2, that the computing environment includes four Processor Modules (PODs) and four MCLs in each MSU. With this configuration, each MDA will include four POD Data Queue Blocks and four MSU Data Queue Blocks. The POD Data Queue Blocks are analogous to the POD Data Queue 245 described in connection with FIG. 2, and the MSU Data Queue Blocks are analogous to the MCL Data Queue 246. From the description provided herein, it will be readily apparent to those skilled in the art that the number of POD Data Queue Blocks and MSU Data Queue Blocks is dependent upon the number of PODs and MCLs desired in a particular computing environment. However, the principles described herein are equally applicable to any desired configuration.

Referring to FIG. 5, an MDA 230 in accordance with the invention is illustrated. Each POD Data Queue Block 500, 502, 504, 506 includes two input queues, labeled POD IN Q0 and POD IN Q1. For example, POD Data Queue Block 500 includes POD IN Q0 508 and POD IN Q1 510. POD Data Queue Block 502 includes POD IN Q0 512 and POD IN Q1 514. POD Data Queue Block 504 includes POD IN Q0 516 and POD IN Q1 518, and POD Data Queue Block 506 includes POD IN Q0 520 and POD IN Q1 522. Each of these POD input queues is for receiving data from its respective POD. While each POD Data Queue Block in the illustrated embodiment includes two input queues, the present invention is equally applicable to embodiments including only one input queue per POD Data Queue Block or more than two input queues per POD Data Queue Block without departing from the scope and spirit of the invention. This will become clear upon an understanding of the following description, particularly the description in connection with FIG. 6.

Each POD Data Queue Block 500, 502, 504, 506 also includes one output queue, labeled POD OUT Q. For example, POD Data Queue Block 500 includes POD OUT Q 524, POD Data Queue Block 502 includes POD OUT Q 526, POD Data Queue Block 504 includes POD OUT Q 528, and POD Data Queue Block 506 includes POD OUT Q 530. Each of these POD output queues is for providing data to the respective POD. In the illustrated embodiment, data stored in a POD output queue is received from one of at least two sources, including from a POD input queue which occurs in the case of a POD-to-POD data transfer, or from an MSU input queue which is discussed more fully below.

FIG. 5 also illustrates that a plurality of MSU Data Queue Blocks 550, 552, 554 and 556 are present in the MDA 230. Each MSU Data Queue Block 550, 552, 554, 556 includes two MSU input queues, labeled MSU IN Q0 and MSU IN Q1. More specifically, MSU Data Queue Block 550 includes MSU IN Q0 558 and MSU IN Q1 560, MSU Data Queue Block 552 includes MSU IN Q0 562 and MSU IN Q1 564, MSU Data Queue Block 554 includes MSU IN Q0 566 and MSU IN Q1 568, and MSU Data Queue Block 556 includes MSU IN Q0 570 and MSU IN Q1 572. Each of the MSU input queues is for receiving data from the MSU to be transferred to a POD output queue in a POD Data Queue Block 500, 502, 504, 506. Each MSU Data Queue Block 550, 552, 554, 556 also includes an MSU output queue, labeled MSU OUT Q. More specifically, MSU Data Queue Block 550 includes MSU OUT Q 574, MSU Data Queue Block 552 includes MSU OUT Q 576, MSU Data Queue Block 554 includes MSU OUT Q 578, and MSU Data Queue Block 556 includes MSU OUT Q 580. Each MSU output queue is for receiving data signals from one of the POD input queues which is to be written to the MSU.

The data flow from POD to MSU is initiated by a POD, which provides data to its respective POD input queue destined for an MSU output queue and ultimately to an MCL in the MSU. The data flow from MSU to POD is initiated by an MCL, which provides data to its respective MSU input queue destined for a POD output queue for ultimate transmission to the targeted POD. Essentially, the data transfer of FIG. 5 can be visualized as sixteen data sources (eight POD input queues and eight MSU input queues) vying for access to eight data destinations (four POD output queues and four MSU output queues). This interconnect is accomplished using the Data Crossbar Interconnect 590, which was generically illustrated in FIG. 2 as the Data Queue Interconnect Logic 247. The Data Crossbar Interconnect 590 is capable of connecting any of the POD input queues (508, 510, 512, 514, 516, 518, 520, 522) to any of the MSU output queues (574, 576, 578, 580), and also to any of the POD output queues (524, 526, 528, 530) in the case of a POD-to-POD data transfer.

In order for the Data Queue Interconnect Logic 590 to know how the interconnection is to be made, control signals must be provided to the Data Queue Interconnect Logic 590. These interconnect control signals are at least in part based on the target address corresponding to the data to be transferred, and as previously described, originate at the MCA 250 shown in FIG. 2.

Within the MCA 250, all store/fetch (i.e., non-message) input requests are initially entered into a store/fetch queue. The operation of such store/fetch queue may be determined in a manner described herein and in copending U.S. patent application, Ser. No. 09/096,822 entitled "Queueing Architecture and Control System For Data Processing System Having Independently-Operative Data and Address Interfaces", filed on Jun. 12, 1998, which is assigned to the assignee of the instant application, the contents of which are incorporated herein by reference. Each store/fetch input request includes address and function signals. A store-type input request typically includes corresponding data to be stored, which is stored into MDA POD input queues and tracked by the MCA Data Valid Routing Logic also described in U.S. patent application, Ser. No. 09/096,822. The store/fetch queue logic adds additional information to each input request and reformats the request as required for further processing by other downstream MCA request queue structures. When these internal MCA request queues schedule the request for completion, any required transfer of data from a source data queue to a destination data queue is also issued as an internal data transfer request to a Data Crossbar Controller (DCC) within the MCA 250. In one embodiment, the DCC is a logical portion of the MCA Control Logic 265 depicted in FIG. 2, which provides control signals to the Data Queue Interconnect Logic 247 via Control Signals 275. Control Signals 275 provide the data routing control to logically connect a data source queue to a data destination queue, and also initiate sequences to move the data.

Figure 6:
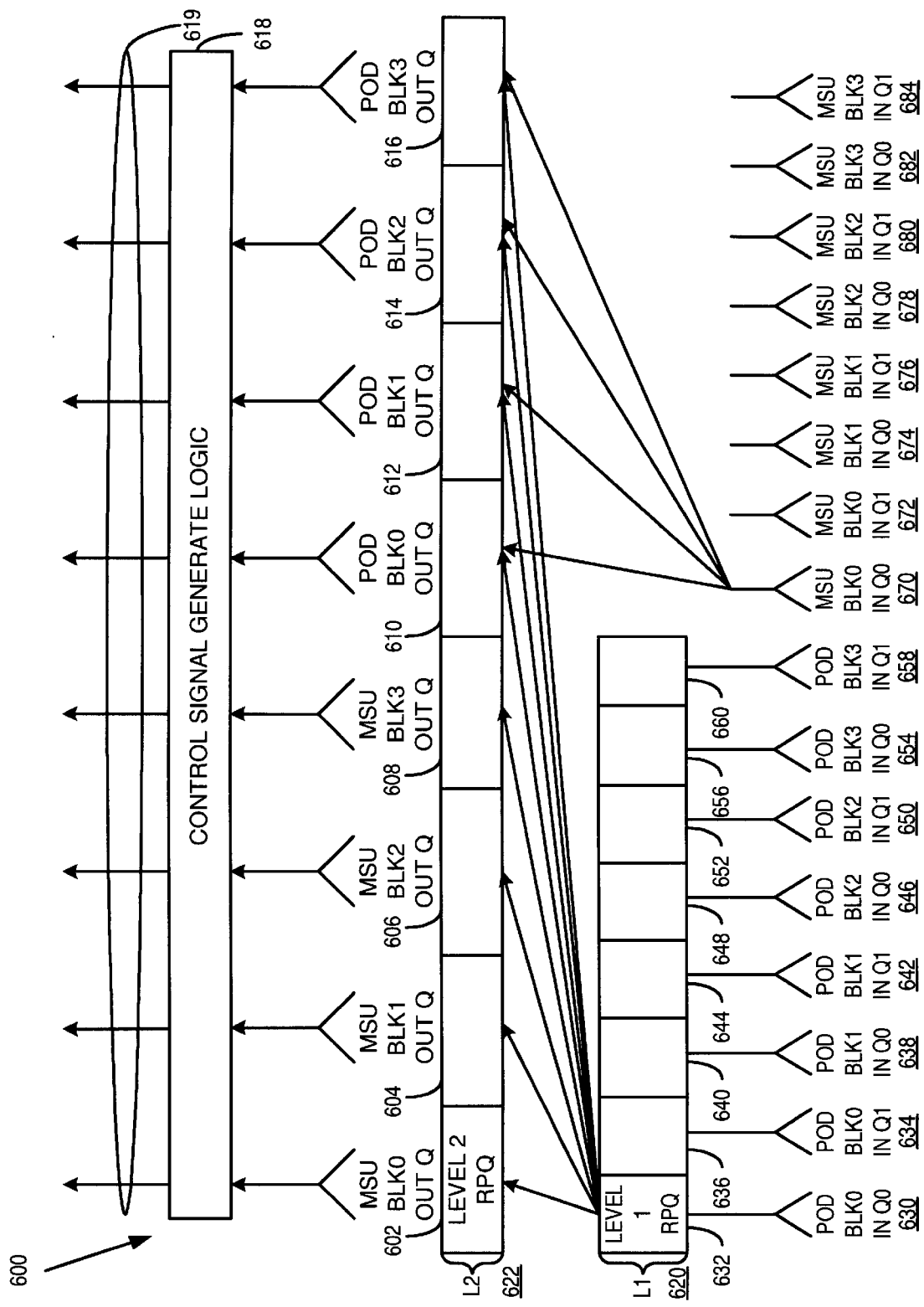
FIG. 6 is a block diagram of one embodiment of the Data Crossbar Controller (DCC) in accordance with the present invention.

FIG. 6 is a block diagram of one embodiment of the Data Crossbar Controller (DCC) in accordance with the present invention. The DCC 600 receives the internal data transfer requests (DRQSTs) which identify a data source queue and a data destination queue. The DCC 600 is organized into eight independent output request queue (OUT Q) control groups (i.e., four MSU OUT Qs and four POD OUT Qs). Each of these output request queues are shown in FIG. 6. The four MSU output request queues are labeled MSU BLK0 OUT Q 602, MSU BLK1 OUT Q 604, MSU BLK2 OUT Q 606, and MSU BLK3 OUT Q 608. The four POD output request queues are labeled POD BLK0 OUT Q 610, POD BLK1 OUT Q 612, POD BLK2 OUT Q 614, and POD BLK3 OUT Q 616. Each of these eight control groups in the MCA ultimately provides control signals to the MDA to control the routing of data between a source data queue and a destination data queue. The control signals for a particular data transfer request are generated using the information from the OUT Q for that particular data transfer request, and are generated by the Control Signal Generate Logic 618. Each of the eight control groups in the MCA also directs the queues data transfer requests to the destination device identified in the data transfer request using control line sequencing.

The output of the Control Signal Generate Logic 618 includes the control signals on control lines 619 necessary to control the routing of data between a source data queue and a destination data queue, and are transferred from the DCC 600 to the Data Crossbar Interconnect 590 (see FIG. 5) at the MDA. Because each of the control groups 602–616 can provide control signals, each set of control signals operates independently of each other to maximize the routing capability of the data path interconnect in the MDA. The dual-level queuing architecture of the present invention is capable of operation with various types of control signals to be output from the Control Signal Generate Logic 618, and the present invention is not dependent on any specific function or objective of each individual control signal. However, in one embodiment, the control signals provide timing and routing control information to the MDA, including POD input queue pointer information to identify the entry within the POD input queue to be transferred, as well as other addressing information to identify data and initiate the movement of data.

The DCC 600 can schedule the DRQST execution using a variety of priority algorithms. In a preferred embodiment of the invention, the DCC schedules the DRQST execution using a Least-Recently-Serviced Rotational Priority (LRSRP) technique. Such an LRSRP technique is described in copending U.S. patent application Ser. No. 09/218,210, filed Dec. 22, 1998, Number RA-5111, entitled "Transfer Request Selection Method And Apparatus For Symmetrical Multiprocessor Systems", assigned to the assignee of the instant application, the contents of which are incorporated herein by reference.

The DCC performs the data crossbar routing control. Other independent MCA logic performs the control required to load new data into the POD input queues and MSU input queues, and to transfer data out of the POD output queues and MSU output queues. However, for output queue data removal, the DCC notifies the transfer-out logic that the data is available for transfer. After the DCC notification of available output data, the transfer-out logic executes the final transfer across its associated interface based on interface protocols and availability. The DCC is inhibited from scheduling another crossbar data transfer to a destination data queue that has not been emptied.

Although the independent operation of the OUT Q control group (602–616) queues within the MCA provides maximum routing capability, it also creates problems if two sets of control lines attempt to route data from the same source queue to different destination queues at the same time. Such an attempt would result in indeterminate results. The DCC 600 includes a dual-level priority scheme to prevent such a situation.

Referring again to FIG. 6, the DCC 600 includes a dual-level queuing architecture, including Level 1 (L1) 620 and Level 2 (L2) 622. In accordance with one embodiment of the invention, this dual-level structure is used for all DRQSTs that specify POD input queue (POD IN Q) data sources. DRQSTs specifying an MSU input queue (MSU IN Q) data source are loaded directly into the POD OUT Q control group logic of L2 622, as will be described in greater detail below.

The POD BLK0 IN Q0 data request in FIG. 6 represents data transfer requests specifying the data source queue POD IN Q0 508 of the POD Data Queue Block 500 shown in FIG. 5. Similarly, the POD BLK0 IN Q1 represents data transfer requests specifying POD IN Q1 510, POD BLK1 IN Q0 represents data transfer requests specifying POD IN Q0 512, and so forth. The MSU data transfer requests are also depicted in FIG. 5. MSU BLK0 IN Q0 represents data transfer requests specifying MSU IN Q0 558 of the MSU Data Queue Block 550, the MSU BLK0 IN Q1 represents data transfer requests specifying MSU IN Q1 560, and so forth.

The first level, L1 620, includes an independent Request Priority Queue (RPQ) for each set of data transfer requests associated with a particular one of the POD IN Qs. Data transfer request POD BLK0 IN Q0 630 represents those data transfer requests associated with POD IN Q0 508 of FIG. 5, and are loaded into L1 620 at RPQ 632. Data transfer request POD BLK0 IN Q1 634 represents those data transfer requests associated with POD IN Q1 510, and are loaded into RPQ 636. Similarly, POD BLK1 IN Q0 638 represents data transfer requests associated with POD IN Q0 512 and are loaded into RPQ 640; POD BLK1 IN Q1 642 represents data transfer requests associated with POD IN Q1 514 and are loaded into RPQ 644; POD BLK2 IN Q0 646 represents data transfer requests associated with POD IN Q0 516 and are loaded into RPQ 648; POD BLK2 IN Q1 650 represents data transfer requests associated with POD IN Q1 518 and are loaded into RPQ 652; POD BLK3 IN Q0 654 represents data transfer requests associated with POD IN Q0 520 and are loaded into RPQ 656; and POD BLK3 IN Q1 658 represents data transfer requests associated with POD IN Q1 522 and are loaded into RPQ 660.

When a data transfer request (DRQST) is received by the DCC identifying a POD data source queue, it is loaded into its corresponding RPQ in L1 620. Each of the RPQs in L1 620 will therefore contain data transfer requests associated only with a particular one of the POD data source queues. Each DRQST specifies a POD data source queue entry and a data destination queue. Therefore, the generalized structure can support multiple source queue entries each directed to a different destination, and a single source queue entry directed to multiple destinations, as long as the RPQ is designed with a DRQST slot for each different combination. While the number of physical output queues in the present example is eight (four MSU BLK OUT Qs and four POD BLK OUT Qs), the actual number of DRQST instances using a given POD data source queue can be higher in accordance with design requirements. The present example contains 12 DRQST slots per RPQ, and is built to accommodate three independent DRQST initiating structures: one to initiate POD to MSU data transfers (store), one to initiate POD to POD data transfers (fetch), and one to initiate POD to POD message data transfers. The eight output queues each receive the data transfer requests from the DRQST slots to which it is designated as the output queue. In this example the RPQs in L1 620 each have 12 DRQST slots, which include (1) four DRQST slots for POD to POD message data transfer delivery to up to four PODs, where each DRQST specifies the same POD data source queue but a unique POD destination queue; (2) four DRQST slots for POD to POD fetch data transfers from the source data queue, each to a unique POD destination output queue; and (3) four DRQST slots for POD to MSU store data transfers from the source data queue, each to a unique MSU destination output queue. Different design requirements may lead to expanding or contracting the size of the L1 RPQ. The POD to POD message data transfers and the POD to POD fetch data transfers are both directed to the POD BLK OUT Qs to which their respective data transfer requests designate as the destination queue.

As described above, the present example contains eight possible OUT Q destinations. These eight destinations are MSU BLK0 OUT Q 602, MSU BLK1 OUT Q 604, MSU BLK2 OUT Q 606, MSU BLK3 OUT Q 608, POD BLK0 OUT Q 610, POD BLK1 OUT Q 612, POD BLK2 OUT Q 614, and POD BLK3 OUT Q 616 of L2 622, and correspond to the ultimate destination data queues identified in FIG. 5 as POD OUT Q 524, POD OUT Q 526, POD OUT Q 528, POD OUT Q 530, MSU OUT Q 574, MSU OUT Q 576, MSU OUT Q 578, and MSU OUT Q 580. It should be recognized that the number of output request queue destinations will depend on the memory configuration of the system. The present example includes four Memory Clusters 235 per MSU 110 four Processing Modules 120, resulting in eight possible output request queue destinations. In a system including a greater number of PODs 120 or Memory Clusters 235, the number of output request queue destinations would be greater.

Figure 7:
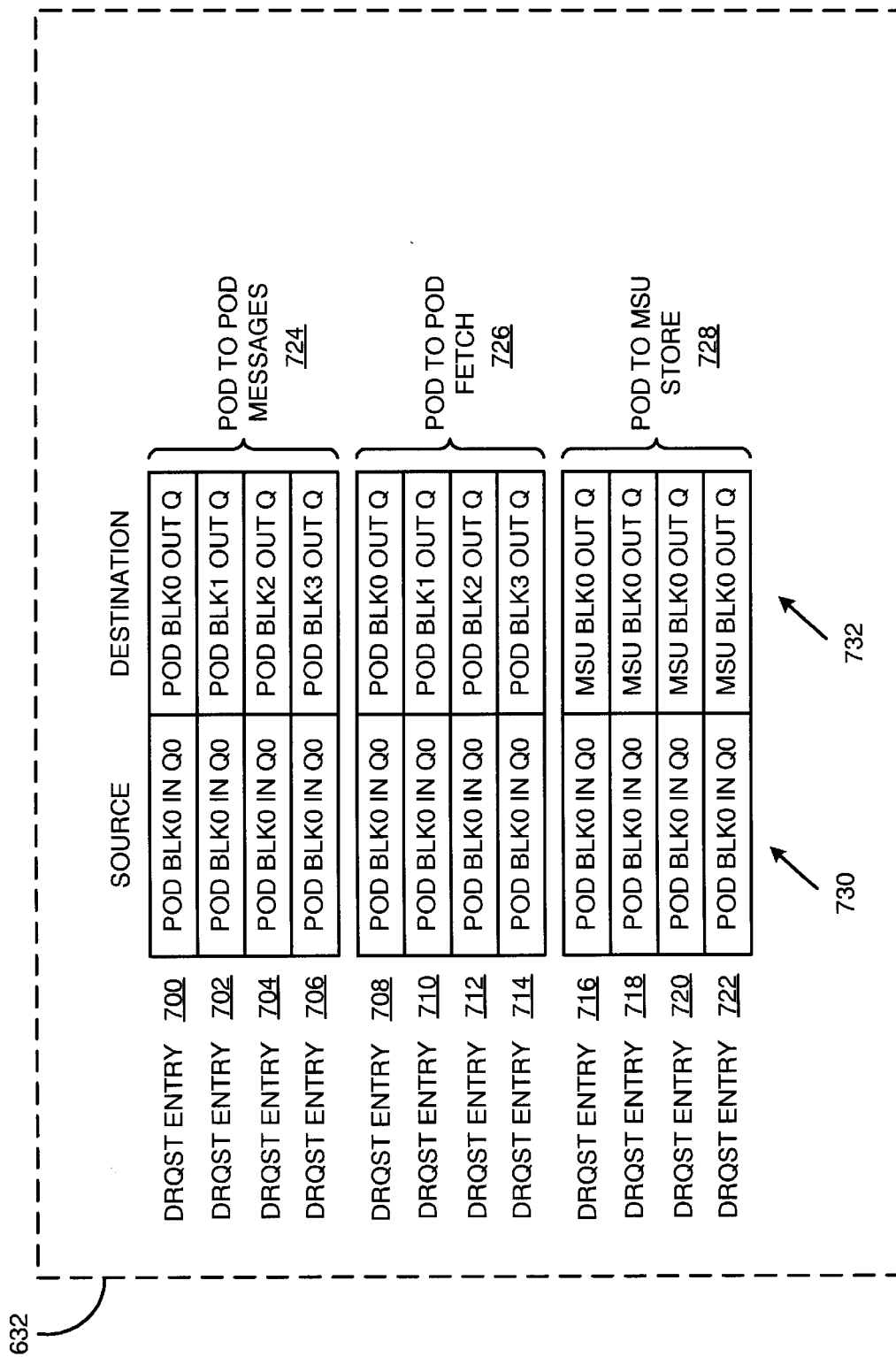
FIG. 7 illustrates one embodiment of a Level 1 Request Priority Queue (RPQ) in accordance the present invention.

Referring briefly to FIG. 7, an example of a L1 620 RPQ 632 is provided in accordance with one embodiment of the invention. It should be noted that each of the L1 620 LPQs have an analogous structure. In this example, the RPQ 632 includes 12 data request queue entries 700–722. As described above, this example RPQ includes 12 DRQST slots, including four DRQST slots for POD to POD message data transfer delivery as depicted by entry block 724, four DRQST slots for POD to POD fetch data transfers as depicted by entry block 726, and four DRQST slots for POD to MSU store data transfers as depicted by entry block 728. As illustrated in the Source column 730 in FIG. 7, the POD Input Queue designated for the L1 620 RPQ 632 is always POD BLK0 IN Q0 630. For POD to POD messages, transfer requests can be provided to any of the POD BLK OUT Qs 610, 612, 614, 616 as illustrated by the Destination column 732 associated with entry block 724. Message transfers provide a means for facilitating processor-to-processor communication, and will typically include some data with the request. Similarly, for POD to POD fetch requests, data transfer requests can be provided to any of the POD BLK OUT Qs 610, 612, 614, 616 as illustrated by the Destination column 732 associated with entry block 726. For POD to MSU store requests, the POD BLK0 IN Q0 queues can provide data transfer requests to any of the MSU BLK OUT Qs 602, 604, 606, 608 as illustrated by the Destination column 732 associated with entry block 728. Actual scheduling of the output of any of these entries 700–722 is accomplished in accordance with a predetermined request priority scheduling scheme.

Referring again to FIG. 6, each data transfer request within a particular RPQ in L1 620 identifies a common data source queue and a particular data destination queue. Multiple data transfer requests within a particular RPQ in L1 620 may be output from that RPQ in any desired order. For example, the RPQ may function as a standard first-in-first-out (FIFO) queue, or may alternatively utilize a priority scheme. In a preferred embodiment, a Least-Recently-Serviced Rotational Priority (LRSRP) scheme is implemented. Such a priority scheme provides a technique for prioritizing the delivery of information transfer requests, such as data transfer requests, from a queue where multiple data transfer requests may be concurrently pending. The LRSRP technique allows inactive requesters assigned to higher priorities than a granted requester to maintain their current relative priority rank, while allowing all requesters assigned to lower priorities than the granted requester to collectively increment in priority ranking. The granted requester is then reassigned to the lowest priority. The LRSRP technique therefore selects one of a total number of potential data transfer requests for further processing, and ensures that each requester will be guaranteed a delay no greater than a predetermined, yet adjustable, maximum delay from the time of request initiation to the time of its transmission grant. Such an LRSRP technique is described in copending U.S. Patent application Ser. No. 09/218,210, filed Dec. 22, 1998, entitled "Transfer Request Selection Method And Apparatus For Symmetrical Multiprocessor Systems", assigned to the assignee of the instant application, the contents of which are incorporated herein by reference.

When one of the data transfer requests within a particular RPQ of L1 620 gains priority in accordance with the implemented priority scheme, it proceeds to the second level L2 622 of the DCC 600 priority structure. In the example embodiment, L2 622 includes eight independent request priority queues (RPQ). The particular L2 622 RPQ to which the data transfer request is directed depends on the identified data destination queue within the data transfer request. For example, where the scheduled data transfer request (i.e., the data transfer request gaining priority) within the L1 RPQ 632 identifies a desired MSU output queue MSU OUT Q 574 shown in FIG. 5, the scheduled data transfer request is first directed to the corresponding L2 RPQ, which in this example is the MSU output request queue labeled MSU BLK0 OUT Q 602. Therefore, each L2 622 RPQ will contain data transfer requests associated with one POD output queue (e.g., POD OUT Q) a or MSU output queue (e.g., MSU OUT Q).

Within a particular L2 622 RPQ, each data transfer request specifies a data transfer request from a different data source queue, such as POD IN Q0 508 or POD IN Q1 510. For example, within the L2 RPQ 610 for the POD BLK0 OUT Q control group, there may be multiple data transfer requests, where each of these data transfer requests specifies the output queue POD OUT Q 524 as the data destination queue, and where each of these data transfer requests identifies a particular data source queue (i.e., IN Q) of which there are sixteen possible in this example.

Each L2 622 RPQ associated with a POD output queue control group (i.e., RPQs 610, 612, 614, 616) schedules multiple data transfer requests using a desired priority scheme. As was true for the case of L1 RPQs, a preferred embodiment implements the LRSRP scheme.

However, in one embodiment of the invention, each L2 622 RPQ associated with an MSU output queue control group (i.e., 602, 604, 606, 608) can store only one data transfer request. In this manner, a data transfer request specifying an MSU output queue (e.g., MSU OUT Q 574, MSU OUT Q 576, MSU OUT Q 578, and MSU OUT Q 580 of FIG. 5) will gain priority immediately upon reaching the corresponding L2 622 RPQ.

Because the L2 622 RPQs operate independently, only one data transfer request for each particular data source queue (IN Q) is allowed to reach L2. Otherwise, multiple data transfers specifying the same data source queue could be signaled simultaneously on the independent control lines 619 from the MCA 250 to the MDA 230. This is because the Control Signal Generate Logic 618 provides independent control interfaces for each of the independently operating L2 622 RPQs, and can therefore provide concurrent control outputs to the MDA 230. The data transfers are associated with different entries (addresses) within the data source queue, where the data source queue address is supplied as part of the control line sequencing. Therefore, simultaneous data transfers from the same data source queue represent simultaneous reads of different locations of a single-port memory structure, and the results are undefined.

The dual-level structure of the DCC 600 solves this problem however. Each L1 620 RPQ represents data transfer requests for a single data source, and each L1 620 RPQ can only output one data transfer request at a time. Therefore, only one data transfer request sourcing a given data source queue can be released at a time, to L2 622. Once that data transfer request has reached L2 622, all data transfer requests for that data source at L1 620 are inhibited until the L2 622 data transfer request completes processing. During the time a given L1 620 RPQ is inhibited, other L1 620 RPQs can still be enabled, if one of their data transfer requests is not currently held in L2 622. In other words, data transfer requests specifying "other" data source queues can be released to L2 622.

Each L2 622 RPQ associated with a POD output request queue (e.g., RPQs 610, 612, 614, 616) can contain up to sixteen data transfer requests in a preferred embodiment of the invention. The number sixteen was chosen to facilitate the Least-Recently-Serviced Rotational Priority scheme employed to schedule data transfers from the POD output queues, and is not a mandatory quantity with respect to the invention.

If a single POD output request queue (e.g., RPQ 610) were to have all sixteen queue locations occupied at a given time, no other L2 622 RPQ hoping to accomplish a data transfer would be allowed to receive an L1 620 data transfer request.

This is because only one data transfer request can be issued for each data source queue in the MDA 230, and that particular L2 RPQ would have a data transfer request from each of the L1 620 RPQs. Each of the other L2 RPQs could experience a long delay if their outstanding data transfer requests are at the bottom of the priority ranking. For example, where there are sixteen queue locations filled in L2 RPQ 610, and L2 RPQ 612 needs a data transfer request from L1 RPQ 660 but L2 RPQ 610 has ranked the previous data transfer request from L1 RPQ 660 at the lowest priority ranking (sixteenth in this example), L2 RPQ 612 could not receive a data transfer request from L1 RPQ 660 until all 16 transfers from L2 RPQ 610 have been effected. This would seriously affect the data exchange rate within the MDA 230 (in fact down to 1/8 of the total capacity), which is undesirable for a high-performance memory system. While load balancing characteristics inherent in the Least-Recently-Serviced Rotational Priority structures are beneficial, additional data transfer request flow control is required.

The DCC 600 provides this additional data transfer request flow control by allowing each POD output request queue (L2 622 RPQ) to hold only up to a specified number of data transfer requests from the POD input request queues at L1 620. The number may be fixed to a predetermined number, or in another embodiment is user-specified. A user can program the maximum number of data transfer requests to be stored into the POD output request queues during initialization procedures. In one embodiment, this is accomplished during initialization using scan set techniques, which are known in the art. When the programmed number of allowable data transfer requests is reached in any of the POD output request queues, all L1 data transfer requests specifying that data destination queue is inhibited until the L2 RPQ drops below this threshold. This allows other L1 data transfer requests to be released to the remaining RPQs, thereby maximizing the likelihood of operating with all L2 RPQs active rather than only one active POD output request queue and the others being idle.

It should be noted that in the above-described embodiment, the data transfer requests identifying MSU data source queues (i.e., MSU BLK0 IN Q0 670, MSU BLK0 IN Q1 672, MSU BLK1 IN Q0 674, MSU BLK1 IN Q1 676, MSU BLK2 IN Q0 678, MSU BLK2 IN Q1 680, MSU BLK3 IN Q0 682, and MSU BLK3 IN Q1 684) do not utilize the dual-level approach. Rather, they are loaded directly into the appropriate L2 622 RPQ. For example, MSU BLK0 IN Q0 670 provides data transfer requests directly to RPQs 610, 612, 614 and 616 of L2 622. This allows POD to MSU data transfer requests to gain immediate priority. This preferred design requirement is not mandatory for purposes of the present invention.

Specifically, data transfer request MSU BLK0 IN Q0 670 represents those data transfer requests associated with MSU IN Q0 558 of FIG. 5, and are loaded into the appropriate L2 622 RPQ. Data transfer request MSU BLK0 IN Q1 672 represents those data transfer requests associated with MSU IN Q1 560, and are loaded into the appropriate L2 622 RPQ. Similarly, MSU BLK1 IN Q0 674 represents data transfer requests associated with MSU IN Q0 562; MSU BLK1 IN Q1 676 represents data transfer requests associated with MSU IN Q1 564; MSU BLK2 IN Q0 678 represents data transfer requests associated with MSU IN Q0 566; MSU BLK2 IN Q1 680 represents data transfer requests associated with MSU IN Q1 568; MSU BLK3 IN Q0 682 represents data transfer requests associated with MSU IN Q0 570; and MSU BLK3 IN Q1 684 represents data transfer requests associated with MSU IN Q1 572. Each of these data transfer requests associated with the MSU input queues are directly provided to the appropriate RPQ in Level 2 622.

Further, data transfer requests 670–684 identifying MSU data source queues are not required to have an interconnection to MSU output request queues 602–608. This is because the memory, or MSU 110, does not make internal data transfers in this manner. On the other hand, POD data transfer requests 630, 634, 638, 642, 646, 650, 654 and 658 have an interconnection, via L1 620, to all of the RPQs in L2 622. This is because a POD can make a data transfer to the MSU or to another POD. For example, a POD-to-POD transfer for data transfer request POD BLK0 IN Q0 630 would enter RPQ 632, and could identify POD BLK3 OUT Q associated with RPQ 616 as its destination. This would facilitate a POD-to-POD data transfer from POD IN Q0 508 of POD Data Queue Block 500 to POD OUT Q 530 of POD Queue Block 506 via the Data Crossbar Interconnect 590.

Figure 8:
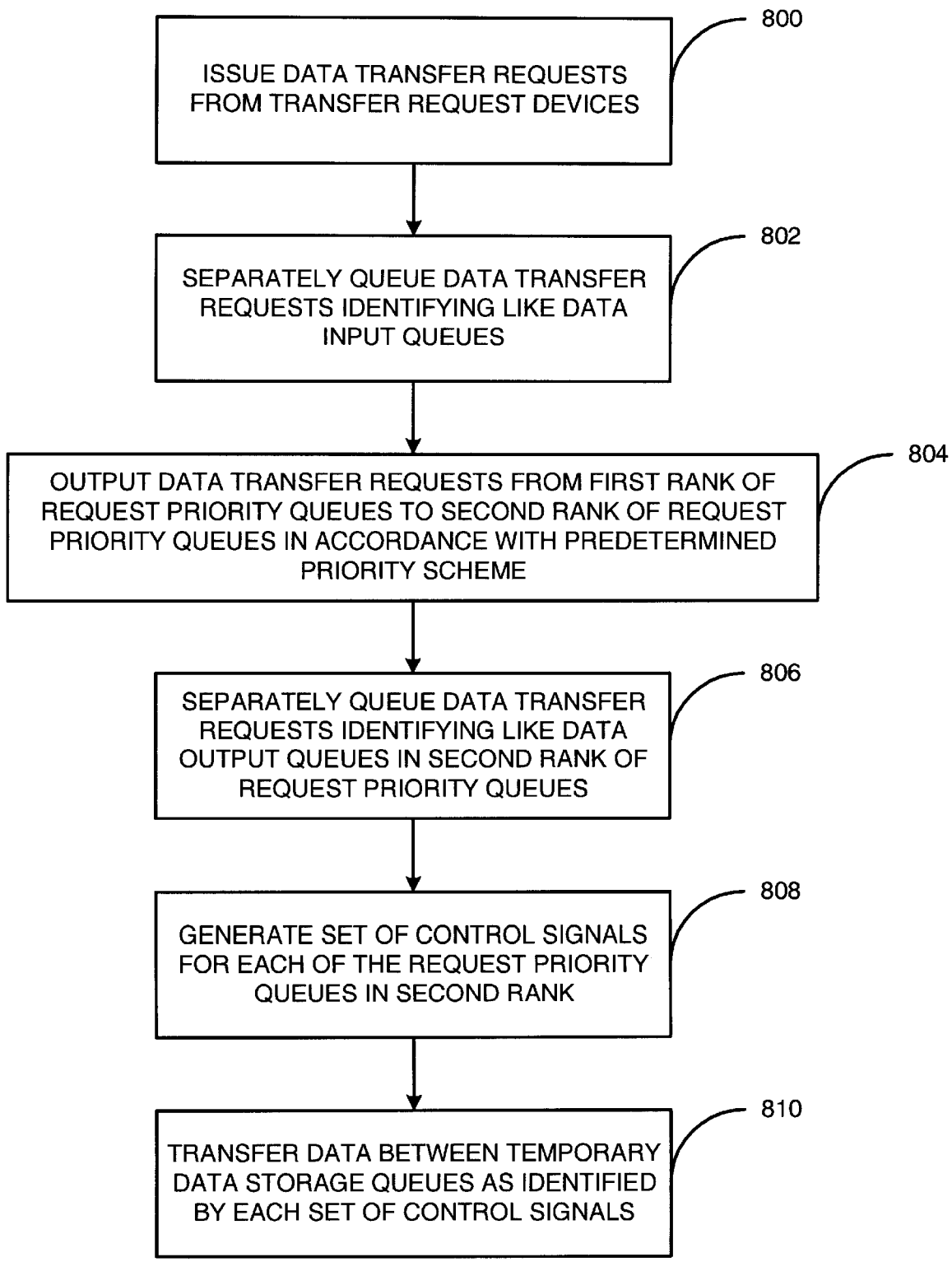
FIG. 8 is a flow diagram of one manner of controlling the flow of data transfer requests in accordance with the present invention.

FIG. 8 is a flow diagram of one manner of controlling the flow of data transfer requests in accordance with the present invention. Data transfer requests are issued 800 from transfer request devices. These devices can include any of the PODs 120, the MSUs 110, or the I/O Modules 140. The data transfer requests will designate one of the data input queues (e.g., POD IN Q0 508) and one of the data output queues (e.g., MSU OUT Q 574) for which the data transfer is to be effected. Each of the data transfer requests are queued 802 such that the data transfer requests identifying a particular one of the data input queues are queued together, and separate from the rest of the data transfer requests. Therefore, each of the L1 620 RPQs will store only those data transfer requests from a particular one of the requesting devices. Each of the input request queues in the first rank of queues includes a predetermined number of data transfer request locations in which data transfer requests may be stored.

Some of the requesting devices may bypass the first rank of queues, and issue their data transfer requests directly to the second rank. For example, in the embodiment of FIG. 6, MSU to POD data fetch requests are provided directly to the L2 622 queues.

As illustrated at block 804, the data transfer requests are transferred from the first rank of request priority queues to a second rank of request priority queues. The second rank of request priority queues includes multiple queues, each of which stores only those data transfer requests identifying a particular one of the data output queues, as indicated at block 806. For example, POD BLK0 OUT Q 610 (FIG. 6) stores only those data transfer requests identifying POD OUT Q 524 of the POD Data Queue Block-0 500 (FIG. 5) as the destination data output queue. The data transfer requests are scheduled for output from the first rank of queues and from the second rank of queues in accordance with a predetermined priority scheme, such as the LRSRP scheme previously discussed.

A set of control signals is generated 808 for each of the request priority queues in the second rank. The control signals associated with each set of control signals identifies the data input and output queues for which the data transfer is to occur. These control signal sets are transmitted to the MDA to cause this transfer of data, as indicated at block 810. Each control signal set in one embodiment is independently generated, and can therefore be concurrently transmitted to the Data Crossbar Interconnect 590. In one embodiment, only one of the data transfer requests from any given L1 620 RPQ is allowed to reside in the L2 622 RPQs. In this manner, no two concurrently-issued control signal sets will be provided to the Data Crossbar Interconnect 590 at a time, thereby eliminating the possibility of multiple read requests being simultaneously delivered to a single-port memory.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for controlling transfers of data between devices in a data processing system, wherein each of the devices has both a designated data input queue to temporarily store data being transferred from the device and a designated data output queue to temporarily store data that is output from other devices for receipt by the device, and wherein the transfer of data is initiated via data transfer requests that identify the data input queue and data output queue for which the data is to be transferred therebetween, the method comprising:

issuing data transfer requests from one or more of the devices;

commonly queuing the data transfer requests identifying like data input queues in corresponding first distinct queues of a first queuing stage;

transferring each of the data transfer requests from the first queuing stage to a second queuing stage, wherein the second queuing stage comprises second distinct queues that each receive and queue only those data transfer requests identifying like data output queues;

generating a control signal set for each of the data transfer requests output from each of the second distinct queues, wherein each control signal set identifies the data input queue and the data output queue between which the data is to be transferred; and transferring the data from the identified data input queues to the identified data output queues in response to the corresponding control signal sets.

2. The method of claim 1, wherein queuing each of the data transfer requests in the first distinct queues comprises queuing up to a predetermined number of the data transfer requests that identify like data input queues in each of the first distinct queues.

3. The method of claim 2, wherein each of the predetermined number of data transfer requests identifies a common data input queue, and a different combination of the data output queues and data transfer types.

4. The method of claim 3, wherein the data transfer types are selected from a group comprising a device-to-device message, a data store request, and a data fetch request.

5. The method of claim 1, wherein issuing data transfer requests comprises bypassing the first distinct queues with the data transfer requests issued from predetermined ones of the devices, wherein each of the data transfer requests of the predetermined ones of the devices are provided directly to one of the second distinct queues in accordance with the data output queue identified in the corresponding data transfer request.

6. The method of claim 1, further comprising concurrently dispatching one or more of the control signal sets to a data interconnect module that controls the transfer of the data from the data input queues to the data output queues.

7. The method of claim 6, further comprising allowing only one of the data transfer requests identifying a given one of the data input queues to be resident in any of the second distinct queues at a time, thereby disallowing a concurrent dispatch of multiple ones of the control signal sets that identify like data input queues.

8. The method of claim 6, further comprising transferring the data from the data output queue, which received the data from the corresponding data input queue, to a destination device identified by the corresponding data transfer request.

9. The method of claim 1, wherein generating a control signal set for each of the data transfer requests from the second distinct queues comprises:

independently generating the control signals sets for each of the data transfer requests from the second distinct queues;

concurrently dispatching one or more of the control signal sets; and controlling the transfer of the data from each of the data input queues identified by the control signal sets to each of the corresponding data output queues identified by the control signal sets.

10. The method of claim 1, wherein queuing each of the data transfer in the first distinct queues comprises storing the data transfer requests in each of the first distinct queues until scheduled for output in accordance with a predetermined request priority scheme.

11. The method of claim 10, wherein storing the data transfer requests in the first distinct queues until scheduled for output in accordance with a predetermined priority scheme comprises scheduling the data transfer requests for output in accordance with a least-recently-serviced rotational priority scheme.

12. The method of claim 1, wherein queuing each of the data transfer in the second distinct queues comprises storing the data transfer requests in each of the second distinct queues until scheduled for output in accordance with a predetermined request priority scheme.

13. The method of claim 12, wherein storing the data transfer requests in the second distinct queues until scheduled for output in accordance with a predetermined priority scheme comprises scheduling the data transfer requests for output in accordance with a least-recently-serviced rotational priority scheme.

14. The method of claim 1, wherein queuing each of the data transfer requests in the second distinct queues comprises queuing up to a predetermined number of the data transfer requests that identify like data output queues in each of the second distinct queues.

15. The method of claim 14, wherein queuing up to a predetermined number of data transfer requests that identify like data output queues in each of the second distinct queues comprises allowing user-specified selection of the predetermined number of data transfer requests in each of the second distinct queues.

16. A multi-level priority control system for managing data transfer requests in data processing system having a plurality of data request sources to generate the data transfer requests, and having a data interconnect module to establish data transfer connections between identified ones of a plurality of data input queues and a plurality of data output queues, wherein each of the data transfer requests includes an identification of one of the data input queues and one of the data output queues to which the data transfer is to be effected, the control system comprising:

a first request queue stage having a plurality of input request queues coupled to respective ones of the data request sources to receive and temporarily store corresponding ones of the data transfer requests;

a second request queue stage having a plurality of output request queues, wherein each one of the output request queues is coupled to each one of the input request queues to receive and temporarily store those of the data transfer requests that identify a particular one of the data output queues as a destination for the data transfer; and a control signal generator coupled to the second request queue stage to receive the data transfer requests from each of the output request queues and to provide a plurality of control signal groups to the data interconnect module, wherein each of the control signal groups includes control signals associated with one of the output request queues to direct the data interconnect module to route the data between the data input and output queues identified by the corresponding data transfer request.

17. The control system as in claim 16, wherein each of the input request queues stores only those data transfer requests associated with a particular one of the data input queues.

18. The control system as in claim 16, wherein each of the output request queues holds only those data transfer requests associated with a particular one of the data output queues.

19. The control system as in claim 16, wherein each of the output request queues has a predetermined number of request locations for storing the data transfer requests from the input request queues.

20. The control system as in claim 19, further comprising means for reducing the predetermined number of request locations in the output request queues.

21. A data transfer system for transferring data between memory modules in a data processing system, the data processing system including a plurality of processing modules having associated local memories and including a main memory having a plurality of memory banks, the data transfer system including:
- a plurality of data input queues each coupled to a respective one of the local memories and the memory banks to receive data requested via a data transfer request;
- a plurality of data output queues each coupled to a respective one of the local memories and the memory banks to receive the requested data from the data input queues and to provide the requested data to a requesting one of the local memories and memory banks;
- a data interconnect module coupled to the data input queues and to the data output queues to facilitate transfer of the requested data from the data input queues to the data output queues in response to control signals; and
- a transfer request control circuit comprising:
  - a first request queue stage having a plurality of input request queues coupled to respective ones of the processing modules to receive and temporarily store corresponding ones of the data transfer requests, wherein the data transfer requests includes an identification of one of the data input queues and one of the data output queues between which the data transfer is to occur;
  - a second request queue stage having a plurality of output request queues, wherein each one of the output request queues is coupled to each one of the input request queues to receive and temporarily store those of the data transfer requests that identify a particular one of the data output queues as a destination for the data transfers; and
  - a control signal generator coupled to the second request queue stage to receive the data transfer requests from each of the output request queues and to provide a plurality of control signal groups to the data interconnect module, wherein each of the control signal groups includes control signals associated with one of the output request queues to direct the data interconnect module to transfer the data between the data input and output queues in response thereto.

22. A multi-level priority control system for controlling transfers of data between devices in a data processing system, wherein each of the devices has both a designated data input queue to temporarily store data being transferred from the device and a designated data output queue to temporarily store data that is output from other devices for receipt by the device, and wherein the transfer of data is initiated via data transfer requests that identify the data input queue and data output queue for which the data is to be transferred therebetween, the control system comprising:
- request generation means for issuing data transfer requests from one or more of the devices;
- a plurality of first queuing means for queuing each of the data transfer requests issued from the one or more devices, wherein the data transfer requests identifying like data input queues are separately queued in separate ones of the plurality of first queuing means;
- a plurality of second queuing means for queuing each of the data transfer requests from each of the plurality of first queuing means, wherein each of the second queuing means receives and queues only those data transfer requests identifying like data output queues;
- means for generating a control signal set for each of the data transfer requests output from each of the second queuing means, wherein each control signal set identifies the data input queue and the data output queue between which the data is to be transferred; and
- means for transferring the data from the identified data input queues to the identified data output queues in response to the corresponding control signal sets.

23. The control system as in claim 22, further comprising data interconnect means for selectively connecting the identified data input queues and the data output queues to facilitate the transfer of the data.

24. The control system as in claim 23, further comprising means for concurrently providing each of the generated control signal sets to the data interconnect means.

25. The control system as in claim 24, wherein the data interconnect means comprises means for concurrently receiving a plurality of the control signal sets, and for concurrently connecting each of the identified data input queues and the identified data output queues.

26. A method for controlling transfers of data between devices in a data processing system, wherein each of the devices has both a designated data input queue to temporarily store data being transferred from the device and a designated data output queue to temporarily store data that is output from other devices for receipt by the device, and wherein the transfer of data is initiated via data transfer requests that identify the data input queue and data output queue for which the data is to be transferred therebetween, the method comprising:
- issuing data transfer requests from one or more of the devices, wherein issuing data transfer requests comprises bypassing the first distinct queues with the data transfer requests issued from predetermined ones of the devices, wherein each of the data transfer requests of the predetermined ones of the devices are provided directly to one of the second distinct queues in accordance with the data output queue identified in the corresponding data transfer request;
- queuing each of the data transfer requests issued from the one or more devices, wherein the data transfer requests identifying like data input queues are commonly queued in first distinct queues;
- transferring each of the data transfer requests from each of the first distinct queues to second distinct queues, wherein each of the second distinct queues receives and queues only those data transfer requests identifying like data output queues;
- generating a control signal set for each of the data transfer requests output from each of the second distinct queues, wherein each control signal set identifies the data input queue and the data output queue between which the data is to be transferred; and
- transferring the data from the identified data input queues to the identified data output queues in response to the corresponding control signal sets.

27. A multi-level priority control system for managing data transfer requests in a data processing system having a plurality of data request sources to generate the data transfer requests, and having a data interconnect module to establish data transfer connections between identified ones of a plurality of data input queues and a plurality of data output queues, wherein each of the data transfer requests includes an identification of one of the data input queues and one of the data output queues to which the data transfer is to be effected, the control system comprising:

- a first request queue stage having a plurality of input request queues coupled to respective ones of the data request sources to receive and temporarily store corresponding ones of the data transfer requests;
- a second request queue stage having a plurality of output request queues, wherein each one of the output request queues is coupled to each one of the input request queues to receive and temporarily store those of the data transfer requests that identify a particular one of the data output queues as a destination for the data transfer;
- a control signal generator coupled to the second request queue stage to receive the data transfer requests from each of the output request queues and to provide a plurality of control signal groups to the data interconnect module, wherein each of the control signal groups includes control signals associated with one of the output request queues to direct the data interconnect module to route the data between the data input and output queues identified by the corresponding data transfer request; and
- wherein each of the input request queues has a number of request locations for storing only those data transfer requests associated with a particular one of the data input queues, and wherein each of the request locations within a given one of the input request queues stores data transfer requests identifying a common data input queue and a different combination of the data output queues and data transfer types.

28. The control system as in claim 27, wherein the request locations within the given one of the input request queues comprises a plurality of message transfer locations to store data transfer requests identifying a message transfer type.

29. The control system as in claim 27, wherein the request locations within the given one of the input request queues comprises a plurality of data store locations to store data transfer requests identifying a data store transfer type.

30. The control system as in claim 27, wherein the request locations within the given one of the input request queues comprises a plurality of data fetch locations to store data transfer requests identifying a data fetch transfer type.

31. A multi-level priority control system for managing data transfer requests in a data processing system having a plurality of data request sources to generate the data transfer requests, and having a data interconnect module to establish data transfer connections between identified ones of a plurality of data input queues and a plurality of data output queues, wherein each of the data transfer requests includes an identification of one of the data input queues and one of the data output queues to which the data transfer is to be effected, the control system comprising:

- a first request queue stage having a plurality of input request queues coupled to respective ones of the data request sources to receive and temporarily store corresponding ones of the data transfer requests;
- a second request queue stage having a plurality of output request queues, wherein each one of the output request queues is coupled to each one of the input request queues to receive and temporarily store those of the data transfer requests that identify a particular one of the data output queues as a destination for the data transfer;
- a control signal generator coupled to the second request queue stage to receive the data transfer requests from each of the output request queues and to provide a plurality of control signal groups to the data interconnect module, wherein each of the control signal groups includes control signals associated with one of the output request queues to direct the data interconnect module to route the data between the data input and output queues identified by the corresponding data transfer request; and
- a second plurality of the data request sources coupled to designated ones of the output request queues in the second request queue stage, wherein the first request stage is bypassed, and the data transfer requests associated with the second plurality of the data request sources are provided directly to the output request queue associated with the data output queue identified by the data transfer requests.

* * * * *